No. 747,220. PATENTED DEC. 15, 1903.
J. W. & B. C. READ.
DISH CLEANER.
APPLICATION FILED FEB. 24, 1903.
NO MODEL.
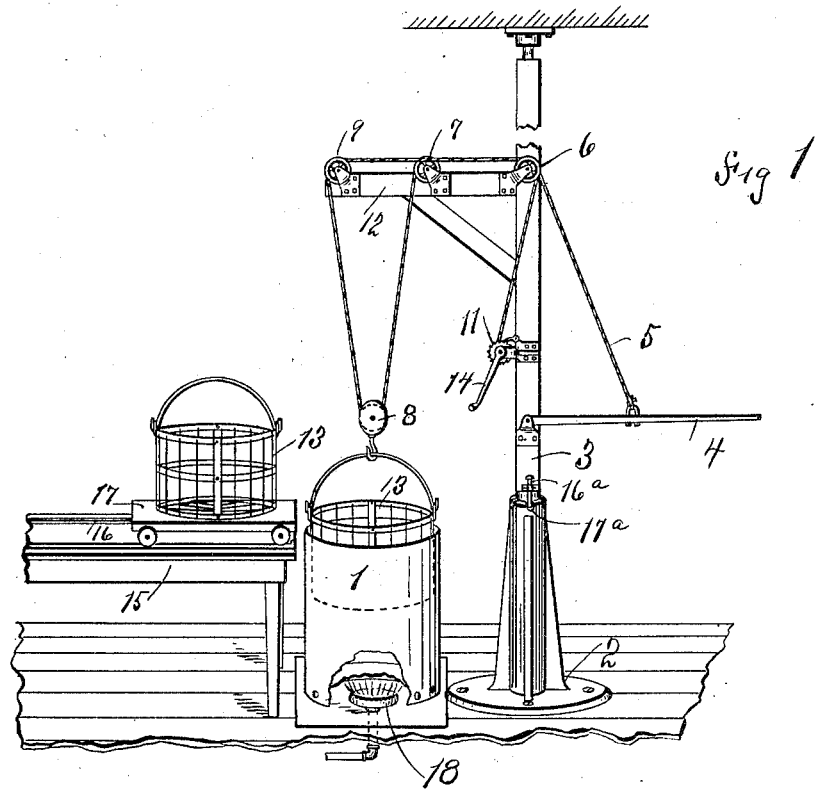
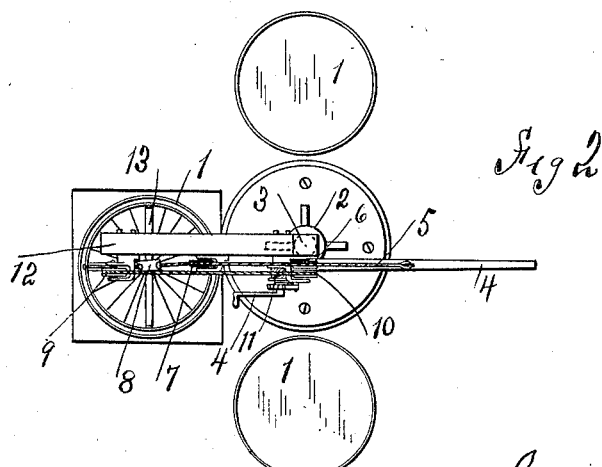
Witnesses
Edward Schier
J. R. Bond.
Inventors
James W. Read
Berton C. Read
By F. W. Bond
Attorney No. 747,220. Patented December 15, 1903.

UNITED STATES PATENT OFFICE.

JAMES W. READ AND BERTON C. READ, OF WOOSTER, OHIO.

DISH-CLEANER.

SPECIFICATION forming part of Letters Patent No. 747,220, dated December 15, 1903.

Application filed February 24, 1903. Serial No. 144,757. (No model.)

*To all whom it may concern:*

Be it known that we, JAMES W. READ and BERTON C. READ, citizens of the United States, residing at Wooster, in the county of Wayne and State of Ohio, have invented certain new and useful Improvements in Dish-Cleaners; and we do hereby declare that the following is a full, clear, and exact description of the same, reference being had to the annexed drawings, making a part of this specification, and to the figures of reference marked thereon, in which—

Figure 1 is a side elevation. Fig. 2 is a top view.

The present invention has relation to dish-cleaners; and it consists in the novel arrangement hereinafter described, and particularly pointed out in the claims.

Similar numerals of reference indicate corresponding parts in both figures of the drawings.

In the accompanying drawings, 1 represents the tanks, which may be arranged as illustrated in Fig. 2, or they may be differently arranged, but should be so arranged that the basket can be withdrawn from any one tank and placed in any other of the tanks shown.

In the drawings we have illustrated the tanks formed separate; but this is simply mechanical, as a single tank with partitions may be provided and the same result accomplished. To the floor or other support is securely attached a base 2, which supports the rotary bar 3, which rotary bar may be extended upward and its upper end secured to the ceiling. The rotary bar 3 is journaled in a socket formed in the upper end of the base 2, and the upper end of the rotary bar is journaled in a proper socket secured to the ceiling or upper framework, as the case may be. The only object is to provide suitable bearings for the upper and lower ends of the bar 3, which may be done in any well-known manner. To the rotary bar 3 is pivotally attached the operating-lever 4, to which operating-lever is attached the cable 5, which cable extends upward and over the pulley 6, thence over the pulley 7 and down under the pulley-block 8, and thence up over the pulley 9, and thence over the pulley 10, and thence downward to the winding drum or spool 11.

For the purpose of properly supporting the pulleys 7 and 9 the lateral arm 12 is provided, which is formed of any desired length and is for the purpose of allowing the tanks 1 to be placed so as not to interfere with the base or support 2 and at the same time provide for moving the cages 13 from tank to tank.

In use water is placed in the various tanks, one of said tanks containing clear water, another of the tanks containing suds, and the other is to contain hot rinsing-water.

The operations are as follows: The dishes designed to be washed are placed in the cage 13, and a reciprocating movement is imparted to said cage by means of the lever 4 and the cable 5, a reciprocating motion being first imparted to the cage in the tank containing clear water, which may be hot or cold, this movement being for the purpose of removing the loose and coarser particles adhering to the dishes, after which the cage, together with the dishes contained therein, is elevated by means of the crank 14 and the spool 11, and after the cage has been elevated so as to clear the top of the tank the rotary post 3 is rotated so as to bring the cage directly over the tank containing the suds and the reciprocating movement continued until the dishes are thoroughly cleaned. The cage is again lifted, as before, and placed in the tank containing the rinsing-water and a reciprocating movement again imparted, which completes the handling of the various cages. A table, such as 15, or other support is provided, said table being provided with a track or way 16, and upon which track or way is mounted a truck 17, and upon which truck the cage containing the dishes is placed, and the truck removed to any desired point within the limits of the travel of the tank. It will be understood that various trucks and various cages may by used.

It will be understood that the rotary post 3 should be locked against rotation during the time the reciprocating movement is imparted to the cage, and for that purpose the sliding catch 16ª is provided, which sliding catch engages one of the notches 17ª, formed in the top or upper end of the base 2. This construction is mechanical and may be departed from, as it will be understood that many ways may be used for temporarily locking the post 3 against rotation.

For the purpose of heating the water contained in any or all of the tanks a burner, such as 18, may be employed and the burner located below the bottom of the tank. In the drawings we have illustrated this burner in a lowered position, as it will be understood that when brought to use it should come in close contact with the bottom of the tank.

A burner may be employed for each tank desired and should be provided if it is desired to heat the water in all of the tanks to be used.

Having fully described our invention, what we claim as new, and desire to secure by Letters Patent, is—

1. In a dish-cleaning machine, a tank, a rotatable bar journaled at its top and bottom ends and provided with a lateral arm, said lateral arm carrying cable-pulleys, an operating-lever pivotally attached to the rotatable bar, a winding-spool carried by said rotatable bar and the winding-spool located intermediate the operating-lever and the pulley-block, and a cable secured to the operating-lever and to the winding-spool, said cable passing over the pulleys, substantially as and for the purpose specified.

2. In a dish-cleaning machine the combination of a rotatable bar journaled at its top and bottom ends, an operating-lever pivoted to said rotatable bar, a winding-spool carried by the rotatable bar, a lateral arm connected to and rotatable with the bar, cable-pulleys carried by the lateral arm, a reciprocating cage and a cable located over the pulleys and adapted to impart reciprocating movement to the cage by means of the operating-lever, and means for limiting the rotation of the bar at predetermined points, substantially as and for the purpose specified.

In testimony that we claim the above we have hereunto subscribed our names in the presence of two witnesses.

JAMES W. READ.
BERTON C. READ.

Witnesses:
J. A. JEFFERS,
F. W. BOND.